(12) United States Patent
Broughton et al.

(10) Patent No.: US 12,133,999 B2
(45) Date of Patent: Nov. 5, 2024

(54) METHODS AND SYSTEM FOR FILLING A SUPPRESSANT CONTAINER

(71) Applicants: Tyco Building Services Products Limited, Middlesex (GB); Macron Safety Systems (UK) Limited, Norfolk (GB)

(72) Inventors: Timothy Broughton, Norfolk (GB); Alan Elder, Manchester (GB); John Walls, Norfolk (GB)

(73) Assignees: Tyco Building Services Products Limited, Sunbury-on-Thames (GB); MACRON SAFETY SYSTEMS (UK) LIMITED, Norfolk (GB)

( * ) Notice: Subject to any disclaimer, the term of this patent is extended or adjusted under 35 U.S.C. 154(b) by 789 days.

(21) Appl. No.: 16/339,511

(22) PCT Filed: Oct. 4, 2017

(86) PCT No.: PCT/EP2017/075209
§ 371 (c)(1),
(2) Date: Apr. 4, 2019

(87) PCT Pub. No.: WO2018/065461
PCT Pub. Date: Apr. 12, 2018

(65) Prior Publication Data
US 2020/0038699 A1    Feb. 6, 2020

Related U.S. Application Data

(60) Provisional application No. 62/404,424, filed on Oct. 5, 2016.

(51) Int. Cl.
*A62C 13/62*     (2006.01)
*A62C 35/02*    (2006.01)
(Continued)

(52) U.S. Cl.
CPC .............. *A62C 13/62* (2013.01); *A62C 35/02* (2013.01); *A62C 99/009* (2013.01); *F16J 12/00* (2013.01);
(Continued)

(58) Field of Classification Search
CPC ....... A62C 13/62; A62C 35/02; A62C 99/009; F16J 12/00; F17C 2205/0323; F17C 2227/0128; F17C 2270/0754
(Continued)

(56) References Cited

U.S. PATENT DOCUMENTS 2,075,408  A  *  3/1937  Sholes ...................... F17C 7/02
                                                          141/3
2,494,454  A  *  1/1950  Ritchie ............... F42B 33/0207
                                                          141/3
(Continued)

FOREIGN PATENT DOCUMENTS

DE       19723788       12/1998
DE       69726828        1/2005
(Continued)

OTHER PUBLICATIONS

Machine Translation of DE69726828T2 Description, Espacenet, Jun. 2022, 7 Pages (Year: 2022).*

(Continued)

*Primary Examiner* — Christopher R Dandridge
*Assistant Examiner* — Kevin Edward Schwartz
(74) *Attorney, Agent, or Firm* — Foley & Lardner LLP

(57) ABSTRACT

Systems and methods for filling and pressurizing a container with liquid suppressant and nitrogen gas. A pressurized receiving container of nitrogen gas is initially provided at a transformative pressure and liquid suppressant is subsequently added to the pressurized receiving container. The transformative gas pressure provides a sufficient amount of (Continued)

nitrogen to saturate the added liquid suppressant and provide an operative head space pressure within the receiving container without the need for mechanized mixing of the nitrogen and liquid suppressant solution.

19 Claims, 4 Drawing Sheets

(51) Int. Cl.
*A62C 99/00* (2010.01)
*F16J 12/00* (2006.01)

(52) U.S. Cl.
CPC .............. *F17C 2205/0323* (2013.01); *F17C 2227/0128* (2013.01); *F17C 2270/0754* (2013.01)

(58) Field of Classification Search
USPC .......................................................... 169/74
See application file for complete search history.

(56) References Cited

U.S. PATENT DOCUMENTS

| | | | |
|---|---|---|---|
| 3,713,493 A | 1/1973 | Hansen | |
| 3,875,980 A | 4/1975 | Getz | |
| 3,915,237 A * | 10/1975 | Rozniecki | A62C 35/605 |
| | | | 169/62 |
| 3,942,561 A | 3/1976 | Stoeffler | |
| 3,951,185 A | 4/1976 | Bower et al. | |
| 4,053,001 A | 10/1977 | Healey et al. | |
| 4,121,632 A | 10/1978 | Zehr | |
| 4,319,640 A * | 3/1982 | Brobeil | A62C 35/02 |
| | | | 220/372 |
| 4,337,803 A | 7/1982 | Monte | |
| 4,657,055 A | 4/1987 | Poulsen | |
| 5,730,193 A * | 3/1998 | Sparks | B09B 3/00 |
| | | | 141/4 |
| 6,112,822 A * | 9/2000 | Robin | A62C 35/023 |
| | | | 169/46 |
| 7,967,035 B2 * | 6/2011 | Brunn | F16J 12/00 |
| | | | 141/3 |
| 8,967,208 B2 | 3/2015 | Bridges et al. | |
| 9,791,105 B2 * | 10/2017 | Whiteman | F17C 5/06 |
| 10,846,975 B2 * | 11/2020 | Tansey, Jr. | B65B 3/10 |
| 11,045,673 B2 * | 6/2021 | Broughton | B67D 7/3272 |
| 11,250,659 B2 * | 2/2022 | Tansey, Jr. | B65B 3/04 |
| 2006/0016608 A1 | 1/2006 | Simpson et al. | |
| 2008/0163954 A1 | 7/2008 | Brunn | |
| 2009/0032272 A1 | 2/2009 | Duncan | |
| 2012/0186691 A1 * | 7/2012 | Bridges | A62C 35/15 |
| | | | 141/2 |
| 2013/0140045 A1 * | 6/2013 | Habitzl | A62C 3/00 |
| | | | 169/16 |
| 2015/0354754 A1 | 12/2015 | Whiteman et al. | |
| 2016/0284153 A1 * | 9/2016 | Tansey, Jr. | B65B 3/04 |
| 2019/0314657 A1 * | 10/2019 | Hofmann | A62C 27/00 |

FOREIGN PATENT DOCUMENTS

| | | |
|---|---|---|
| DE | 10 2007 036 877 | 2/2009 |
| DE | 10 2007 036 877 B4 | 3/2013 |
| FR | 2829399 | 3/2003 |
| WO | WO-2016/013951 A1 | 1/2016 |

OTHER PUBLICATIONS

Machine Translation of DE-102007036877-A1 Description, Espacenet, May 2023, pp. 1-27 (Year: 2023).*
Yang, J. C. et al., "Solubilities of Nitrogen and Freon-23 in Alternative Halon Replacement Agents." Halon Alternatives Technical Working Conference 1993. Proceedings HOTWC, May 11, 1993, pp. 107-112.
International Search Report and Written Opinion for International Application No. PCT/EP2017/075208, dated Dec. 15, 2017, 12 pages.
International Search Report and Written Opinion for International Application No. PCT/EP2017/075209, dated Dec. 15, 2017, 16 pages.
Occupational Safety and Health and Boiler Pressure Container Inspection Bureau of Ministry of Labor of the People's Republic of China, Practical Technical Manual of Industrial Anti-explosion, Liaoning Science and Technology Press, 1st Edition, pp. 331-332.
Wu, Y.S., Pressure Container Safety Technology, Chemical Industry Press, 2nd Edition, pp. 489-493.

* cited by examiner

METHODS AND SYSTEM FOR FILLING A SUPPRESSANT CONTAINER

This application is an international application claiming the benefit of priority to U.S. Provisional Application No. 62/404,424 filed Oct. 5, 2016, which application is incorporated by reference in its entirety.

TECHNICAL FIELD

This invention relates generally to fire suppression systems and their suppressant supply systems. More specifically, the present invention is directed to methods and systems for providing a container of liquid suppressant at an operative pressure for a firefighting suppression systems.

BACKGROUND OF THE INVENTION

Known firefighting suppression systems employ a liquid agent or suppressant that is vaporized to extinguish a fire. One suppressant that is used in these known suppression systems is 3M™ Novec™ 1230 Fire Protection Fluid ("Novec™ 1230") from 3M™. Novec™ 1230 is liquid at room temperature which facilitates ease in handling, storage and transfer. In order to use the Novec™ 1230 in these known firefighting suppression systems, the Novec™ 1230 is stored within one or more container assemblies as a super-pressurized suppressant to 25 bar (360 psi.) at 21 degrees Celsius using nitrogen gas. In use, the containers are connected to system piping for distribution of the suppressant as a vapor through one or more nozzles. By super-pressurizing the suppressant, the agent is discharged as a gas in a system actuation response to a fire. The vaporized suppressant extinguishes the fire principally by heat absorption. Accordingly, for proper operation of such systems, it is critical that the agent be maintained in a super-pressurized state. The containers for these known systems can vary in size range from about 5 liters (5 L) to 180 liters (180 L) or larger. For example, the container can be any one of 4.5 L, 34 L, 80 L, 120 L, 140 L, or 180 L. Accordingly, for a fully charged 180 L container, the final weight is nearly 337 kilograms (743 lbs.) with the volume including an appropriate amount of head space provided above the liquid surface.

There is a known conventional method of filling and super-pressurizing, i.e., charging of cylindrical containers. The liquid suppressant, such as Novec™ 1230 for example, is first added by weight to the container and then the suppressant is subsequently super-pressurized with the addition of nitrogen gas to an operative head space pressure of 25 Bar. The receiving container may initially be pressurized with nitrogen gas to dry the container, but the nitrogen gas is vented to atmosphere just prior to being filled with the liquid suppressant. Accordingly, the liquid suppressant is initially added to a container that is at essentially atmospheric pressure. The nitrogen gas is subsequently fed into the container to supersaturate the liquid suppressant and establish the target operative head space pressure within the cylindrical container. If the liquid suppressant is not sufficiently saturated, i.e., supersaturated, the nitrogen gas within the container will continue to dissolve in the suppressant over time and the head pressure in the container will drop below the operative range.

Mixing of the solution can increase the rate at which the nitrogen dissolves in the suppressant. Thus, in the conventional charging process, the suppressant solution is mixed in a mechanized process to maximize the rate at which the nitrogen dissolves to ensure the supersaturation of the nitrogen in the suppressant, which also minimizes the time to fully charge the containers. The conventional charging process for a 180 L cylindrical container ranges from fifteen to thirty minutes. Given the size and the weight of the cylinders, a mechanized mixing process uses a mechanical mixer to turn, shake and flip or invert the container. As used herein, a mechanical mixer is a powered machine dedicated to manipulating the container for the purpose of mixing the contents therein and not just supporting or positioning the container. The known method includes repeatedly or iteratively adding nitrogen gas and mixing the solution in the mechanized process until the desired head space pressure is achieved and becomes stable. The pressure has stabilized when the head pressure does not drop after mechanized mixing. One known mechanical mixer is a large and heavy mechanical mixing inverter having its own support frame requiring sufficient pneumatic and electrical supply sources and space in which to safely position, handle, secure and manipulate the heaviest of containers. Thus, charging of containers for new installations or for recharging of refurbished containers is usually performed at a fixed location, e.g., filling plant, where the mixing inverter can be properly mounted, set up and guarded to avoid injury to personnel or damage to property. Adding to the complexity of current charging system and methods is the need for very accurate weighing scales to measure the amount of nitrogen by weight for saturating and pressurizing the suppressant. Scales capable of such accuracy can be easily damaged if not adequately guarded and isolated from shock or vibration. Moreover, the gas pressure during the fill process can cause the liquid suppressant to move within the container, which can generate undesirable excessive fluctuations in the weigh scale read out.

The cylindrical containers require regular maintenance and inspection to detect leaks and perform periodic hydrostatic testing of the containers. In the case of a leak or hydrostatic test, the container must be taken out of service and replaced or refurbished with a fully charged container of super-pressurized suppressant. Accordingly, there is a need to disconnect containers and transport the containers, partially or fully filled, from the system site to the filling location for charging. To place the system back in service, the fully charged containers must be transferred, repositioned and reconnected to the system. Suppression systems can be installed in data processing centers, tape storage facilities, offshore platforms, shipping vessels, such as for example in liquid natural gas carriers (LNG) carriers and many other facilities. Disconnecting or installing suppressant containers and moving them to and from the system site can be difficult because of the size and weight of the containers. However, servicing containers in maritime applications is particularly difficult because of the tight spaces in which the containers are often located. Moreover, for LNG carriers and most other sea going vessels, regulations require that vessels must go to port, dock and service their suppression systems in the event of a detected container leak, under pressurized container or system discharged. The vessel is not permitted to leave port until the system is restored to a condition in accordance with the Marine regulations. The time lost in an unscheduled port stop and system service can be very costly for a LNG carrier.

There is need for methods and systems to reliably charge suppressant containers without the need for a mechanized mixing process to avoid the need of transport of containers to and from the filling plant. Moreover, there remains a need and desire to conduct the charging process or a portion thereof at the site of system installation (on-site filling), particularly for maritime applications, to reduce the movement of containers and avoid the dangers and hazards associated with transporting suppressant containers. By providing an on-site charging process that can be completed within a commercially acceptable period of time, the fire protection system downtime can be reduced and the interruption to business operations can be minimized.

DISCLOSURE OF THE INVENTION

Preferred methods and systems provide for a container of saturated liquid suppressant, for example Novec™ 1230, at an operative pressure for a firefighting suppression system. The preferred method and systems provide for charging of a container to a preferred operative head space pressure without the need for mechanized mixing. By eliminating mechanized mixing from the charging process, the preferred systems and methods can provide for on-site filling and pressurization of liquid suppressant within a time comparable or better than available under conventional methods. Additionally, the preferred systems use a calibrated pressure gauge to eliminate the need for a weigh scale at the fill or receiving container.

One preferred method of filling and pressurizing a container with firefighting liquid suppressant includes providing a pressurized receiving container containing nitrogen gas at a transformative pressure for saturating a fill amount of liquid suppressant and establishing an operative head pressure in the container; and subsequently adding the fill amount of liquid suppressant to the receiving container. Preferred embodiments of the fill method include first filling the receiving container with nitrogen and adding liquid suppressant to the container last from a pressurized liquid suppressant source.

In another preferred aspect, a system is provided for filling and pressurizing a container with firefighting liquid suppressant. The preferred system includes a receiving container defining an internal volume; a supply of nitrogen gas coupled to the receiving container for positively pressurizing the internal volume of the container to an internal pressure; a pressurized supply of liquid suppressant; and a transfer pump coupled to the receiving container and the supply of liquid suppressant for transferring the liquid suppressant to the receiving container against the internal pressure to preferably define a nominal head space pressure. By monitoring the head space pressure in the container, the need for mechanical mixing of the receiving container can be eliminated.

BRIEF DESCRIPTIONS OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Figure 1:
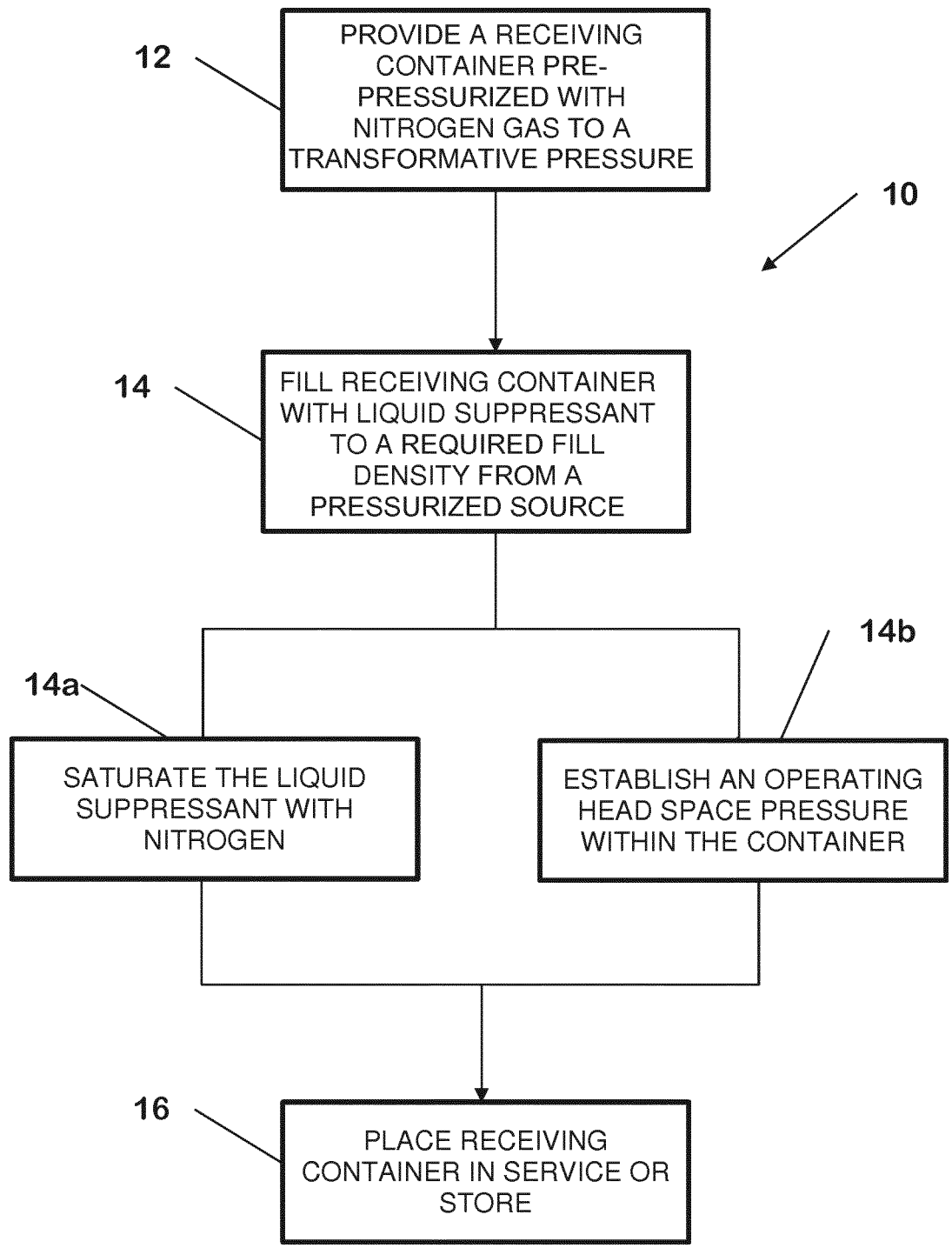
FIG. 1 is a flow chart of a first embodiment of a preferred method of filling and pressurizing a container with liquid suppressant and nitrogen gas.

Shown in FIG. 1 is a preferred method 10 for filling and pressurizing, i.e., "charging" a receiving container with firefighting liquid suppressant, preferably Novec™ 1230 extinguishing agent from 3M™ (American Society of Heating, Refrigerating and Air-Conditioning Engineers (ASHRAE) designation FK-5-1-12) for storage or installation in a firefighting suppressant system (not shown). Alternative fire protection fluids can be used such as, for example, other halocarbon agents or other halocarbon halon alternatives. The preferred method includes a first step 12 of providing a pressurized receiving container pressurized with nitrogen gas at a transformative pressure for a fill amount of liquid suppressant. As used herein, a "transformative pressure" is a pressure at least sufficient to saturate a fill amount of liquid suppressant and additionally pressurize the fill amount of liquid suppressant to an operative head space pressure within the container. As used herein, "operating head space pressure," "operational head space pressure" or "operative head space pressure" is defined as the final stabilized pressure within the container above the fill amount of liquid suppressant preferably at ambient temperature that is sufficient for storage of the pressurized liquid and operation in a firefighting suppressant system. Preferably, the operating head space pressure varies directly with the ambient temperature and is preferably a nominal pressure that can vary within a defined range. As used herein, the ambient temperature preferably ranges from 20 degrees Celsius to 25 degrees Celsius and can range from 21-23 degrees Celsius and is more preferably 21 degrees Celsius. Preferably, the operating head space pressure is at least 25 bar (363 psi.), preferably less than 45 bar (653 psi.) and more preferably ranges between 22 psi. and 28 psi. to define a nominal operating head space pressure of 25 bar at the preferred ambient temperature of 21 degrees Celsius. The ambient temperature can be higher or lower depending upon the operation or storage conditions and the nominal operating head space pressure can vary accordingly. For example, where the ambient temperature is above 25 degrees Celsius, the nominal operating head space pressure can range from 26 bar to 30 bar for temperatures that may range from 30 degrees Celsius to 55 degrees Celsius. Where the ambient temperature is below 20 degrees Celsius, the nominal operating head space pressure can range from 20 bar to 25 bar for temperatures that may range from −20 degrees Celsius to less than 20 degrees Celsius.

A subsequent second step 14 of the preferred method includes filling, adding or transferring to the pressurized receiving container the fill amount of liquid suppressant to preferably define a desired and more preferably a required fill density for the container. The fill density preferably fills the container with an amount of liquid suppressant sufficient to operate the firefighting suppressant system to effectively address a fire. A preferred fill density of liquid suppressant for filling a receiving container is preferably 0.5 kilograms per liter up to about 1 kilogram per liter (kg/L). Other fill densities outside this range are possible. By initially pressurizing the receiving container with a transformative pressure of nitrogen for the given fill amount of suppressant, the suppressant becomes saturated by the nitrogen 14*a* and the desired operating head space pressure 14*b* is established within the container. Because the container is pressurized with nitrogen gas to the preferred transformative pressure, the liquid suppressant is preferably delivered to the container under a pressure sufficient to work against the internal gas pressure and facilitate the saturation of the nitrogen gas into the liquid suppressant. As described herein, preferred embodiments of the charging process can provide that the delivered liquid suppressant is pressurized by a transfer pump alone or in combination with a pressurized source of liquid suppressant. With the first and second steps 12, 14 completed, the pressurized container can be stored for future use or otherwise installed in a preferred concluding step 16 of the preferred method for use in the firefighting suppressant system.

The inventors have determined that by initially filling the receiving container with an adequate amount of nitrogen and then subsequently filling the pressurized container with liquid suppressant, the receiving container can be filled to an operational fill density and head space pressure without need for a mechanized mixing process thereby overcoming the disadvantage of the previously known charging procedures that require mechanized mixing. The inventors have determined that the preferred methods described herein provide for a stable operative head space pressure over two or more days. Additionally, by eliminating the need for mechanized mixing, the time needed to transport and position containers to a mechanical mixer, such as the mechanical inverter previously described, and the actual mixing time can be avoided.

Figure 2:
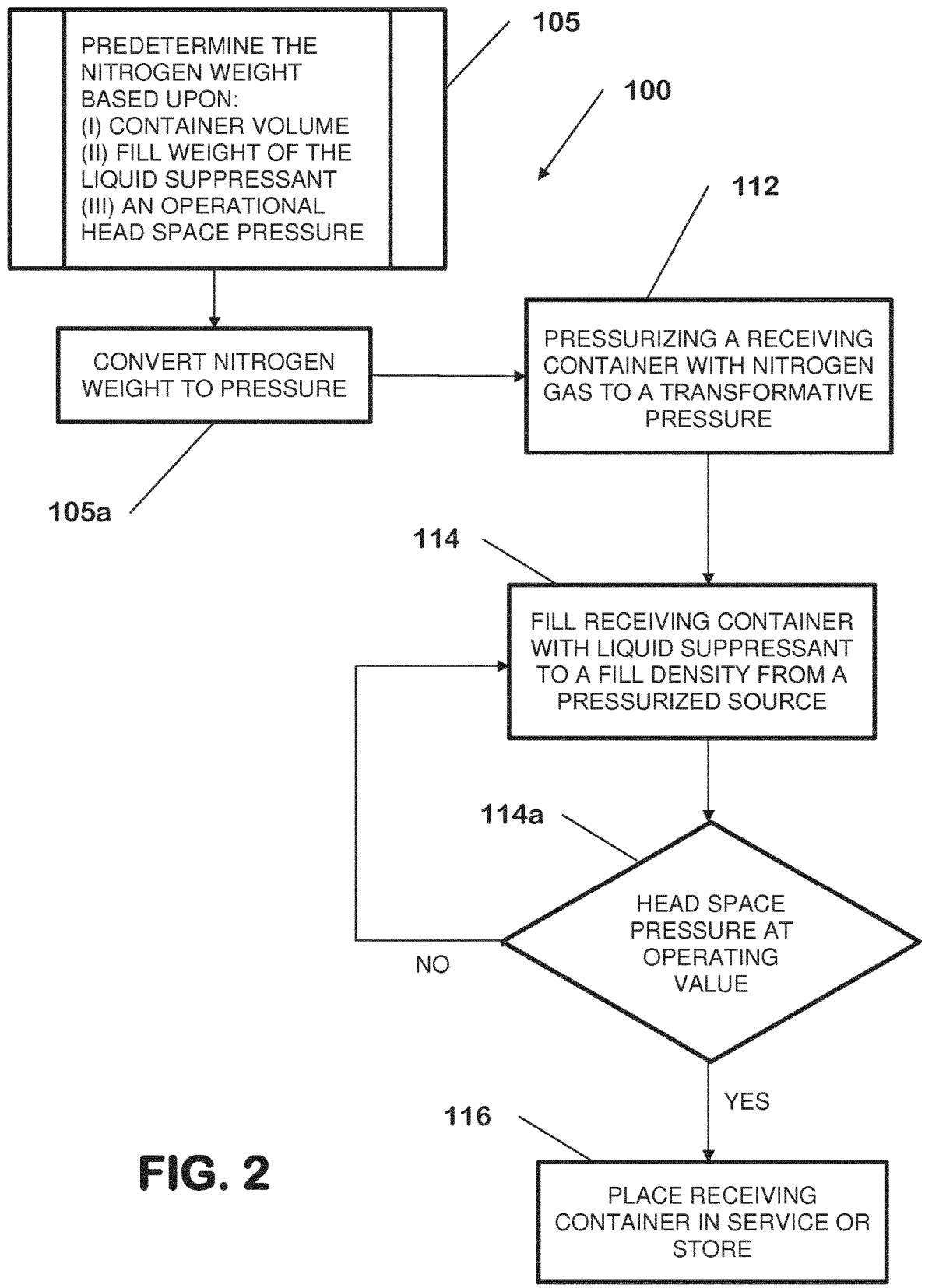
FIG. 2 is a flow chart of a second embodiment of a preferred method of filling and pressurizing a container with liquid suppressant and nitrogen gas.

Shown in FIG. 2 is a preferred embodiment 100 of the charging method. Providing the pressurized container preferably includes determining the pressure of nitrogen as the amount of nitrogen for delivery to the receiving container that is preferably sufficient to saturate the liquid suppressant subsequently fed into the container and establish the operating head space pressure within the container after completing the second step 14 of adding the liquid suppressant. More specifically, the preferred method 100 includes predetermining the transformative pressure of the nitrogen 105 prior to pressurizing the receiving container with nitrogen 112. The preferred step of predetermining the nitrogen pressure 105 includes calculating the weight of nitrogen to be supplied to the receiving container based upon the internal volume of the receiving container, the target operational head space pressure, the anticipated ambient temperature of the container in operation or storage, and the total weight of the liquid suppressant to be supplied to the container in the second step 114 satisfying the desired fill density. The predetermining step 105 preferably includes converting the calculated nitrogen weight to the preferred transformative pressure 105*a* to be delivered to the receiving container to provide the pressurized container in step 112.

The preferred method of filling 114 includes the step 114*a* of monitoring the head space pressure throughout the process step of filling the container with liquid suppressant. More specifically, the preferred process includes continually or intermittently determining the intermediate head space pressures during the step of filling with liquid suppressant up to the operative head space pressure. In the course of filling the container with liquid suppressant, the intermediate head space pressure within the container can vary as the nitrogen mixes and dissolves within the liquid suppressant. If the measured head space pressure is below the operating head space pressure value, for example, below 25 bar, the filling step 114 is repeated or continued to fill the receiving container with liquid suppressant. If the head space pressure is at or within an acceptable range of the operating head space pressure, the filling step 114 is completed and the receiving container can be stored or placed into service 116 to conclude the filling process 100. Again the preferred filling method 100 is performed and completed without mechanized mixing of the solution. In the preferred filling method 100, the head space pressures preferably do not exceed 45 bar or higher threshold pressure; and in the end, the nominal operating head space pressure is preferably at least 25 bar at 21 degrees Celsius.

Figure 3:
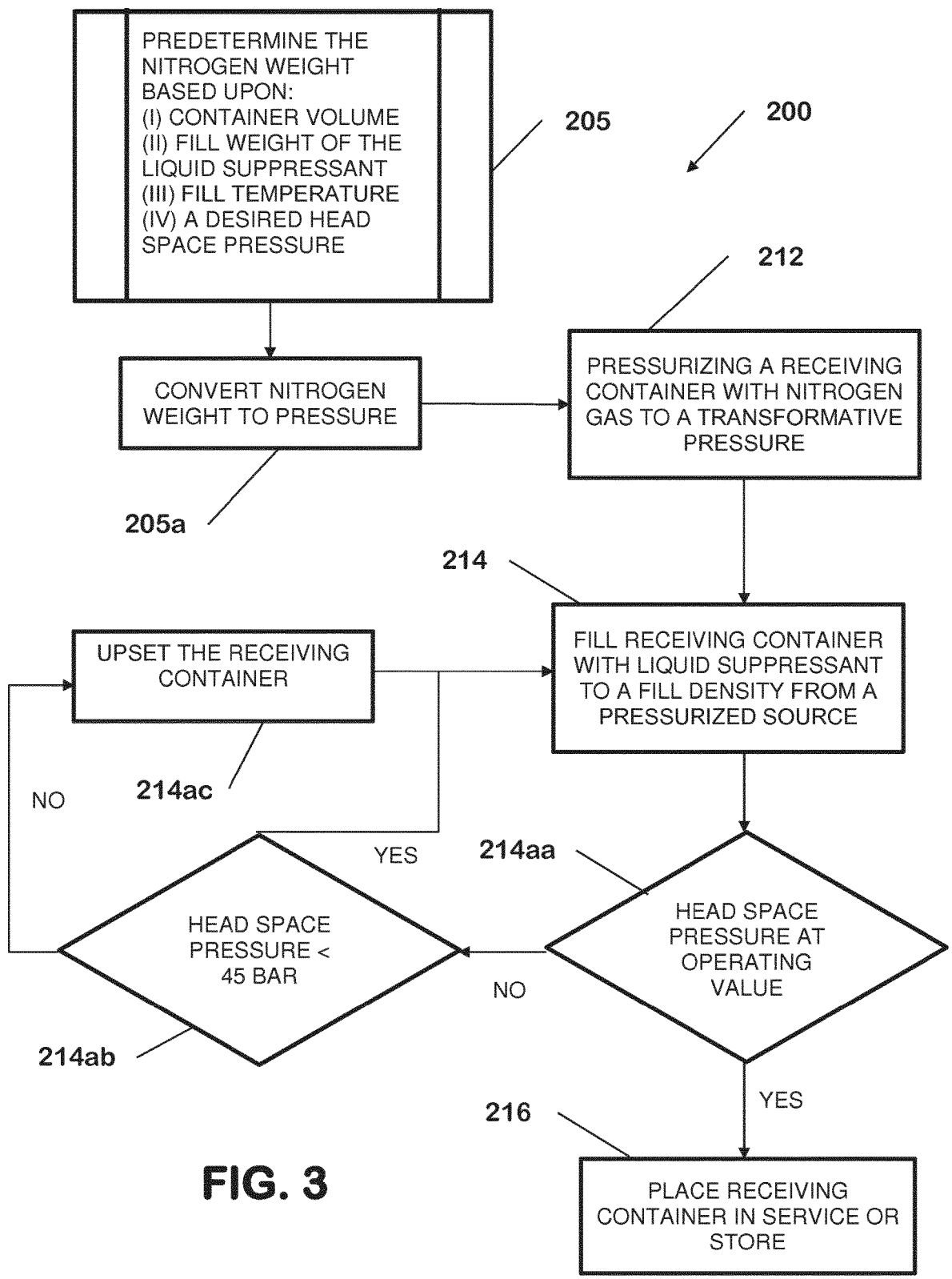
FIG. 3 is a flow chart of a third embodiment of a preferred method of filling and pressurizing a container with liquid suppressant and nitrogen gas.

In an alternative preferred embodiment of the filling method 200 shown in FIG. 3, the receiving container is manually upset to facilitate mixture of the gas and liquid if the head space pressure exceeds a threshold value prior to completing fill of the receiving container with liquid suppressant to the desired fill density. As used herein, to "manually upset" the container is to tilt and/or rotate the container so that the internal mixture moves and the rate at which the nitrogen gas dissolves in the liquid suppressant. Moreover, "manually upsetting" the container is a process that does not require inversion and shaking of the container. Accordingly, "manually upsetting" does not need and excludes the use of a mechanized mixer in a mechanized mixing process.

The filing process 200 preferably includes the previously described steps of predetermining the nitrogen pressure 205, 205*a*, providing a pressurized receiving container 212 with the nitrogen gas and then subsequently filling the receiving container with liquid suppressant 214 while continuously or intermittently measuring the head space pressure 214*aa*. In addition, if the head space pressure is not at the operating value, the preferred method includes determining if the head space pressure exceeds a threshold value 214*ab*, such as for example 45 bar, before the fill density is achieved. If the head space pressure is over the threshold value, the filling step 214 is preferably stopped and the receiver container is preferably manually upset in step 214*ac* to further dissolve the nitrogen gas in the liquid suppressant and lower the head space pressure. With the head space pressure lowered, the filling step 214 continues until the fill density and operating head space pressure is achieved. Once achieved, the process 200 is completed by storing the receiving container or placing the container in service 216.

The preferred second step of transferring the liquid suppressant to fill the receiving container 14, 114, 214 preferably transfers the liquid suppressant from a liquid suppressant supply of a known initial weight. The filling step 14, 114, 214 can include monitoring the weight loss of the liquid supply to reach a predetermined weight value and indicate that the desired amount of liquid suppressant has been transferred from the supply to the receiving container. For preferred embodiments described herein, the liquid suppressant supply is preferably pressurized, for example to the target nominal operating head pressure of 25 bar or greater. Alternatively, the liquid supply of suppressant can be pressurized to lower than 25 to define a lower operating head pressure.

Figure 4:
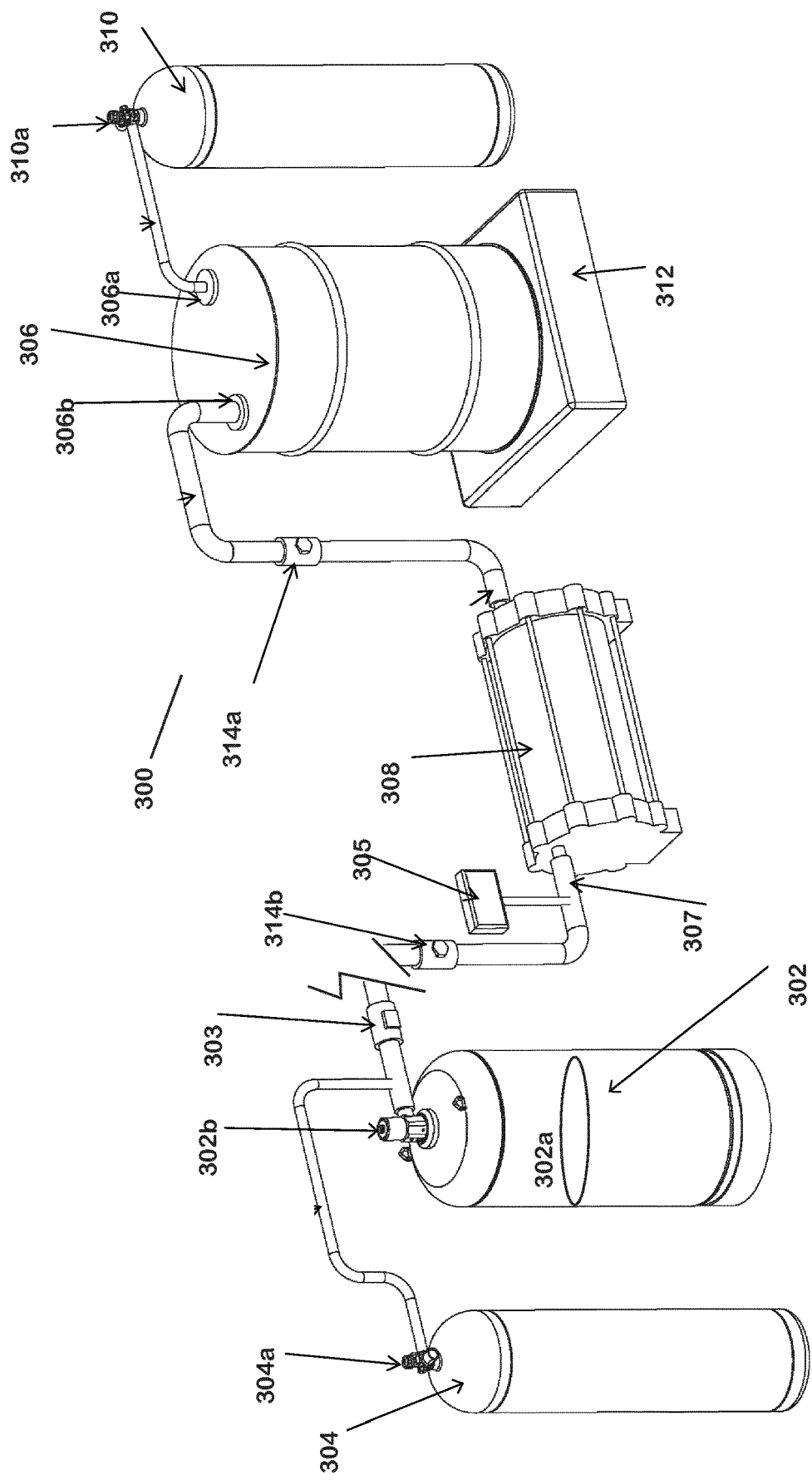
FIG. 4 is a schematic view of a preferred system for carrying out the methods of FIGS. 1-3.

Shown in FIG. 4 is a preferred system 300 for carrying out the previously described processes 10, 100, 200 for filling and pressurizing a container with firefighting liquid suppressant. The preferred system 300 includes a receiving container 302 defining an internal volume to be filled and pressurized with nitrogen gas and liquid suppressant in a manner as described herein. The container 302 is preferably configured for both storage and connection to a firefighting system that employs a pressurized liquid suppressant. Accordingly, the preferred system is configured for charging at the site of the firefighting system or suppressant storage.

The preferred system 300 also includes a supply of nitrogen gas 304 coupled to the receiving container 302 for positively pressurizing the internal volume of the container 302 to a preferably predetermined internal pressure. The system 300 also includes a supply of liquid suppressant 306 and a transfer pump 308 coupled to each of the receiving container 302 and the supply of liquid suppressant 306 for transferring the liquid suppressant to the receiving container 302 against the internal pressure to define a head space pressure in the space 302a above the liquid within the receiving container 302 and more preferably establish a preferred operating head space pressure. In a preferred embodiment of the transfer pump 308, liquid suppressant is transferred to the receiving container 302 against a head space pressure that exceeds 25 bar and more preferably against a head space pressure that ranges from 25-45 bar and that can more preferably transfer against a head space pressure that is greater than 45 bar. To measure the head space pressure in the receiving container 302 and/or changes in pressure in the head space 302a the system 300 preferably includes a pressure gauge 305 preferably calibrated and disposed in the pipe or hose connection between the receiving container 302 and the transfer pump 308.

In preferred embodiments of the systems and methods described herein, the preferred liquid suppressant employed may include but not be limited to Novec™ 1230 extinguishing agent from 3M™. The liquid suppressant can be a newly supplied material or recycled, for example, from the firefighting system validated to be in accordance with the original specification of the liquid suppressant. Moreover, the preferred supply of liquid suppressant 306 is a supply container having a fixed volume of liquid suppressant. For example, the supply of liquid suppressant 306 is embodied as a fifty-five gallon drum of suppressant. Moreover, the supply of liquid suppressant 306 is preferably pressurized with a source of nitrogen gas. Accordingly, in one preferred embodiment of the system 300 the supply of the nitrogen gas 304 is a first source of nitrogen for pressurizing the receiving container 302. The preferred system 300 includes a second source or supply of nitrogen gas 310 coupled to the supply of liquid suppressant 306 to pressurize the liquid suppressant supply 306. Thus, the transfer pump 308 pulls or draws the liquid suppressant from the supply container 306 with the liquid suppressant under pressure of the nitrogen gas. As previously described, preferred embodiments of the filling method include measuring the weight loss in the liquid suppressant supply to determine the amount of liquid suppressant transferred to the receiving container. The preferred system 300 includes a weigh scale 312 to measure the loss in weight of the liquid suppressant supply container 306 during transfer of liquid suppressant to the receiving container 302.

The system 300 includes multiples fittings for isolating any one of the interconnected receiving container 302, the liquid suppressant supply 306, the transfer pump 308 or any one of the first or second nitrogen supplies 304, 310. For example, the receiving container 302 is preferably embodied as a known storage container assembly with a valve 302b, such as for example a SCHRADER® fluid control valve, which can be manually, electrically or pneumatically operated. To control or maintain the direction of the flow of fluids into the receiving container 302, a non-return or check valve 303 is located proximate to the receiver container 302b. Fluid control to and from the transfer pump 308 is preferably controlled by shut-off valves, such as for example, a first ball valve 314a on the inlet side of the transfer pump 308 and a second ball valve 314b on the outlet side of the transfer pump 308. In one preferred method of operation, the second ball valve 314b is closed and the transfer pump 308 is operated to build up a discharge pressure of 55 bar in the transfer piping 307 on the outlet side of the pump 308 before or above the receiving container 302. When the discharge pressure reaches the desired level, the second ball valve 314b is opened for filling of the container 302.

The liquid suppressant source 306 preferably includes an inlet vapor control valve 306a to control the nitrogen gas flow to the suppressant source container 306. The liquid suppressant source 306 also preferably includes an outlet control valve 306b for controlling the flow of liquid suppressant out of the container 306. Each of the first and second nitrogen gas sources 304, 310 include a shut-off valve and regulator 304a, 310a to respectively control the flow and pressure of gas from the first and second nitrogen sources 304, 310. The interconnections between system components can be made with appropriate pipe or hose connections. More preferably, quick-connect fitting are used to make the pipe or hose interconnections. In one preferred aspect of operating the preferred system, prior to operation of the transfer pump, the liquid suppressant source 306 is pressurized by the second nitrogen gas source 310. In the operation, the first ball valve 314a is closed and the liquid suppressant source 306 is pressurized to a preferred pressure of up to 25 bar. Once the liquid suppressant source 306 is at the desired pressure, the ball first valve 314a is opened and the pressure from the liquid source 306 through the pump 308 to the container 302 is permitted to equalize. Upon piping equalization, the transfer pump 308 is started to add liquid suppressant to the container 302.

The preferred system 300 can be used in the preferred methods of filling previously described. In one exemplary filling operation of the preferred method 200, a nitrogen gas pressure is determined based upon the size of the receiving container 302, the target fill weight of the liquid suppressant and the ambient temperature for saturation of the liquid suppressant and the establishing the operational head pressure. The first nitrogen source 304 is connected to the receiving container 302 and the receiving container is pressurized to the predetermined nitrogen pressure. The nitrogen source 304 is then disconnected.

With the outlet control valve 306b closed and the vapor valve 306a open, the liquid suppressant source container 306 is then preferably pressurized by the second nitrogen source 310 to a preferred pressure that ranges from 14 bar up to 25 bar. The second nitrogen source valve 310a and liquid suppress inlet vapor valve 306a are then closed and the suppressant outlet valve opened to permit the flow of liquid suppressant to the transfer pump 308. Each of the first and second ball valves 314a, 314b are placed in the open position to allow the flow of liquid suppressant to the receiving container 302. The transfer pump 308 is then started to transfer of liquid suppressant to the receiver container 302. The change in weight of the liquid suppressant source 306 is measure or monitored using the weigh scale 312. During the liquid suppressant transfer, the pressure gauge 305 is monitored to determine the head space pressure in the receiver container 302. Suppressant transfer continues until the target fill weight is reached in the receiver container 302 and the head space pressure measures in the range of 25 bar to less than 45 bar and more preferably is 25 bar. The SCHRADER® fluid control valve 302b is then closed and the container is placed into service or otherwise stored. The head space pressure in the receiving container could be up to 45 bar, however over a period of a few days the liquid suppressant will absorb nitrogen and the head space pressure will drop to 25 Bar (minus 0% plus 10%) at 21 C. With the monitored head space pressure maintained below the preferred threshold value of 45 bar, the filling process is completed without a mechanized mixing of the receiving container 302.

In addition to controlling the flow of fluids to charge the container 302, the system piping can be configured to facilitate on-site charging of the container, for example on-board a vessel such as an LNG carrier. As schematically shown in FIG. 4, the system piping 307 on the discharge side of the outlet pipe can be any length to reach a container 302 that is located at the site of the system installation or close thereto. Provided the piping 307 and the transfer pump are appropriately hydraulically sized, the container 302 can be positioned at or proximate the system installation for charging. In one preferred aspect, the transfer pump 308 and the liquid suppressant supply 306 can be located and operated remotely from the system site and the container 302. Accordingly, such a system configuration can be used to charge containers in a vessel or ship with any preferred manner described that eliminates the need for a mechanized mixing process. To the extent the containers need to be manually upset, the containers are preferably located on-site in a location to allow for tilting and/or rotation of the container. Such systems and methods can reduce hazards and downtime associated with the transport and charging of receiving containers.

The inventors have determined that by using the preferred systems and methods, the receiving container can be charged without need for a mechanized mixing process or manual upsetting for a range of containers up to 180 L at a fill density of up to 1 kg/L of Novec™ 1230. For larger fill densities, the preferred methods still avoid mechanized mixing but can include a manual upsetting process for mixing the nitrogen gas and liquid suppressant solution and establish the operative head space pressure.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of charging a container of a suppression system without a mechanized mixing process, the method comprising:
    pressurizing the container with a predetermined quantity of nitrogen identified by weight to provide a pressurized container containing nitrogen gas at a transformative pressure for a fill amount of liquid suppressant; and
    adding the fill amount of liquid suppressant to the pressurized container from a pressurized source of the liquid suppressant,
    wherein adding the fill amount of the liquid suppressant includes transferring the liquid suppressant from the pressurized source to the pressurized container using a transfer pump simultaneously coupled to the pressurized source and the pressurized container and comprising an inlet coupled to the pressurized source and an outlet coupled to the pressurized container, equalizing a pressure at the inlet and the outlet by opening a shut-off valve coupled to the inlet before operating the transfer pump, and while transferring the liquid suppressant to the pressurized container measuring a weight of the pressurized source until a loss in weight of the pressurized source equals a predetermined weight value,
    wherein the transformative pressure is a pressure at least sufficient to saturate the fill amount of liquid suppressant within the pressurized container and pressurize the fill amount of liquid suppressant to a target pressure within the pressurized container.

2. The method of claim 1, wherein the transformative pressure is a target pressure that ranges from at least 25 bar to less than 45 bar.

3. The method of claim 2, wherein the target pressure is 25 bar.

4. The method of claim 2, wherein the pressurized container is filled and pressurized to the target pressure in thirty minutes.

5. The method of claim 1, wherein adding the fill amount of the liquid suppressant includes transferring the liquid suppressant into the pressurized container from the pressurized source to define an intermediate pressure during the transfer.

6. The method of claim 1, wherein providing the pressurized container includes pressurizing the container with the predetermined quantity of nitrogen identified by weight that is determined based on an internal volume of the container, the predetermined weight value, and an ambient temperature.

7. A method of charging a container of a suppression system without a mechanized mixing process, the method comprising:
    providing a pressurized container containing nitrogen gas at a transformative pressure for a fill amount of liquid suppressant; and
    adding the fill amount of liquid suppressant to the pressurized container from a pressurized source of the liquid suppressant,
    wherein adding the fill amount of liquid suppressant includes transferring the liquid suppressant from the pressurized source to the pressurized container using a transfer pump simultaneously coupled to the pressurized source and the pressurized container and comprising an inlet coupled to the pressurized source and an outlet coupled to the pressurized container, equalizing a pressure at the inlet and the outlet by opening a shut-off valve coupled to the inlet before operating the transfer pump, and measuring a weight of the pressurized source while transferring the liquid suppressant to the pressurized container until a loss in weight of the pressurized source equals a predetermined weight value,
    wherein providing the pressurized container includes determining the transformative pressure of the nitrogen from a calculated quantity of nitrogen identified by weight to saturate the weight of the fill amount of liquid suppressant and achieve a target pressure at an ambient temperature,
    wherein the transformative pressure is a pressure at least sufficient to saturate the fill amount of liquid suppressant within the pressurized container and pressurize the fill amount of liquid suppressant to the target pressure within the pressurized container.

8. The method of claim 7, wherein the target pressure is a nominal 25 bar.

9. The method of claim 1, wherein transferring the liquid suppressant includes equalizing a pressure between the pressurized container and the pressurized source of the liquid suppressant before operating the transfer pump.

10. The method of claim 1, wherein the liquid suppressant is pressurized to 25 bar at an ambient temperature by a source of nitrogen gas.

11. The method of claim 7, wherein the saturating of the liquid suppressant includes transferring an amount of NOVEC™ 1230 extinguishing agent to the pressurized container.

12. The method of claim 7, wherein saturating the liquid suppressant defines a fill density within the pressurized container of one kilogram per liter (1 kg/L).

13. The method of claim 1, further comprising monitoring a head space pressure within the pressurized container and upsetting the pressurized container when the head space pressure exceeds 45 bar.

14. The method of claim 1, further comprising manually upsetting the container for a fill density of over 1 kg/L.

15. The method of claim 1, wherein the pressurized container is on-site of the suppression system, and wherein adding the fill amount of the liquid suppressant includes transferring the liquid suppressant from off-site of the suppression system to on-site of the suppression system.

16. The method of claim 6, wherein the predetermined quantity of nitrogen identified by weight is sufficient to saturate the fill amount of the liquid suppressant.

17. A method of charging a container of a suppression system without a mechanized mixing process, the method comprising:
   pressurizing the container with a predetermined quantity of nitrogen identified by weight to provide a pressurized container containing nitrogen gas at a transformative pressure; and
   adding a fill amount of unsaturated liquid suppressant to the pressurized container from a pressurized source of liquid suppressant, wherein the pressurized source has a first weight,
   wherein adding the fill amount of the liquid suppressant includes transferring the liquid suppressant from the pressurized source to the pressurized container using a transfer pump simultaneously coupled to the pressurized source and the pressurized container and comprising an inlet coupled to the pressurized source and an outlet coupled to the pressurized container, equalizing a pressure at the inlet and the outlet by opening a shut-off valve coupled to the inlet before operating the transfer pump, and while transferring the liquid suppressant from the pressurized source to the pressurized container measuring a weight of the pressurized source until the pressurized source has a second weight less than the first weight, wherein a difference in weight between the first weight and the second weight equals a predetermined weight value,
   wherein a first portion of the predetermined weight of nitrogen is sufficient to saturate the fill amount of unsaturated liquid suppressant and a second portion of the predetermined weight of nitrogen is sufficient to pressurize the fill amount of liquid suppressant to a target pressure,
   wherein the transformative pressure is a pressure at least sufficient to saturate the fill amount of liquid suppressant within the pressurized container and pressurize the fill amount of liquid suppressant to the target pressure within the pressurized container.

18. The method of claim 17, wherein the target operating head space pressure remains at or above 25 bar over a period of time.

19. The method of claim 1, further comprising measuring the loss in weight of the pressurized source with a weight sensor, wherein the weight sensor is coupled to the pressurized source.

* * * * *